United States Patent
Ferdowsi et al.

(10) Patent No.: US 10,314,067 B2
(45) Date of Patent: *Jun. 4, 2019

(54) RESOURCE REQUEST AND ALLOCATION FOR UPLINK MULTI-USER COMMUNICATION

(71) Applicant: NEWRACOM, INC., Lake Forest, CA (US)

(72) Inventors: Vida Ferdowsi, Irvine, CA (US); Young Hoon Kwon, Laguna Niguel, CA (US)

(73) Assignee: NEWRACOM, INC., Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/059,372

(22) Filed: Aug. 9, 2018

(65) Prior Publication Data

US 2018/0376491 A1    Dec. 27, 2018

Related U.S. Application Data

(63) Continuation of application No. 15/162,518, filed on May 23, 2016, now Pat. No. 10,070,458.

(Continued)

(51) Int. Cl.
*H04W 72/12* (2009.01)
*H04W 84/12* (2009.01)

(52) U.S. Cl.
CPC ........ *H04W 72/1268* (2013.01); *H04W 84/12* (2013.01)

(58) Field of Classification Search
None
See application file for complete search history.

(56) References Cited

U.S. PATENT DOCUMENTS 10,070,458 B2 *   9/2018   Ferdowsi .......... H04W 72/1268
2016/0227565 A1   8/2016   Ghosh

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.

(Continued)

*Primary Examiner* — Diane L Lo
(74) *Attorney, Agent, or Firm* — Morgan, Lewis & Bockius LLP

(57) ABSTRACT

In wireless communications for multi-users, an access point may generate a trigger frame, which may include a trigger indication. The trigger indication may indicate whether a second trigger frame will be transmitted during a time interval. The trigger indication may use a single bit. The trigger frame may also include resource allocation for one or more stations. When the access point transmits the trigger frame, the station(s) may transmit an uplink frame(s) in response to the trigger frame. The access point may transmit a second trigger frame in the time interval. In response to the second trigger frame, the station(s) may transmit additional uplink frame(s) to the access point. The station(s) may save the resource allocation included in the trigger frame and utilize the same resource allocation for the uplink frame(s) and the additional uplink frame(s). Other methods, apparatus, and computer-readable media are also disclosed.

20 Claims, 12 Drawing Sheets

Related U.S. Application Data

(60) Provisional application No. 62/165,862, filed on May 22, 2015, provisional application No. 62/191,301, filed on Jul. 10, 2015.

(56) References Cited

OTHER PUBLICATIONS

LAN/MAN Standards Committee of the IEEE Computer Society, "IEEE Standard for Information technology —Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

\* cited by examiner

FIG. 7

| Element ID | Length (55) | TS Info | Nominal MSDU Size | Maximum MSDU Size | Minimum Service Interval | Maximum Service Interval | Inactivity Interval | Suspension Interval |
|---|---|---|---|---|---|---|---|---|
| Octets: 1 | 1 | 3 | 2 | 2 | 4 | 4 | 4 | 4 |

| Service Start Time | Minimum Data Rate | Mean Data Rate | Peak Data Rate | Burst Size | Delay Bound | Minimum PHY Rate | Surplus Bandwidth Allowance | Medium Time |
|---|---|---|---|---|---|---|---|---|
| Octets: 4 | 4 | 4 | 4 | 4 | 4 | 4 | 2 | 2 |

FIG. 8A

| B0 | B1 B4 B5 | B6 B7 | B8 | B9 | B10 | B11 B13 | B14 B15 | B16 | B17 B23 |
|---|---|---|---|---|---|---|---|---|---|
| Traffic Type | TSID | Direction | Access Policy | Aggregation | APSD | User Priority | TSInfo Ack Policy | Schedule | Reserved |
| Bits: 1 | 4 | 2 | 2 | 1 | 1 | 3 | 2 | 1 | 7 |

| Traffic Type | TSID | Direction | Access Policy | Aggregation | APSD | User Priority | Ack Policy | Schedule | OFDMA | Reserved |
|---|---|---|---|---|---|---|---|---|---|---|
| 1 | 4 | 2 | 2 | 1 | 1 | 3 | 2 | 1 | 1 | 6 |

FIG. 8B

| Traffic Type | TSID | Direction | Access Policy | Aggregation | APSD | User Priority | Ack Policy | Schedule | OFDMA | MU-MIMO | Reserved |
|---|---|---|---|---|---|---|---|---|---|---|---|
| 1 | 4 | 2 | 2 | 1 | 1 | 3 | 2 | 1 | 1 | 1 | 5 |

| Action/Control frame header | OFDMA Element | OFDMA Resource Allocation Element 1 | OFDMA Resource Allocation Element 2 | ... | OFDMA Resource Allocation Element n |

| Num_elements | Reference_ID | BW | Transmission Duration | More Session | Contain_elements |

FIG. 13A

| Group/Individual | STA_ID | Start sub-channel | Number of sub-channel |

FIG. 13B

| Group/Individual | Group_ID | Start sub-channel | Number of sub-channel |

RESOURCE REQUEST AND ALLOCATION FOR UPLINK MULTI-USER COMMUNICATION

CROSS-REFERENCE TO RELATED APPLICATIONS

This application is a continuation of U.S. application Ser. No. 15/162,518, entitled "RESOURCE REQUEST AND ALLOCATION FOR UPLINK MULTI-USER COMMUNICATION," filed May 23, 2016, now issued as U.S. Pat. No. 10,070,458, which claims the benefit of priority from U.S. Provisional Application No. 62/165,862, entitled "RESOURCE REQUEST AND ALLOCATION MECHANISMS IN UPLINK OFDMA/MU-MIMO," filed May 22, 2015, and U.S. Provisional Application No. 62/191,301, entitled "RESOURCE REQUEST AND ALLOCATION MECHANISMS IN UPLINK OFDMA/MU-MIMO," filed Jul. 10, 2015, all of which are incorporated herein by reference in their entirety.

TECHNICAL FIELD

The present description relates in general to wireless communication systems and methods, and more particularly to, for example, without limitation, resource request and allocation for uplink multi-user communication.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

BRIEF DESCRIPTION OF THE DRAWINGS

FIG. 7 illustrates an example of a traffic specification (TSPEC) element.

FIGS. 8A through 8C illustrate examples of a Traffic Stream Information field of a TSPEC element.

FIG. 11 illustrates an example of a trigger frame.

FIG. 12 illustrates an example of an Orthogonal Frequency Division Multiple Access (OFDMA) Element field of a trigger frame.

FIGS. 13A and 13B illustrate examples of an OFDMA Resource Allocation Element field of a trigger frame.

Figure 1:
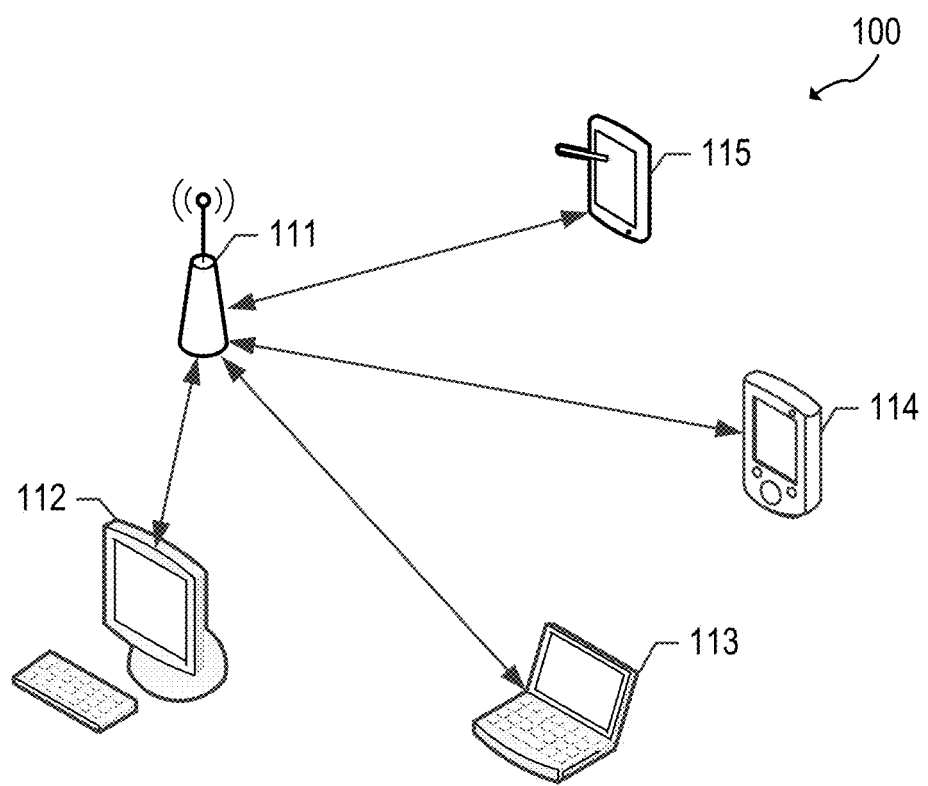
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Systems and methods are disclosed for facilitating uplink (UL) transmissions. One or more implementations of such systems and methods may facilitate resource request and allocation for UL multi-user (MU) transmissions. In some aspects, trigger frame format(s) are utilized/defined for facilitating UL transmissions. In some aspects, a trigger frame may allow use of previously assigned resource(s). For instance, the trigger frame may include an indication to use previously assigned resource(s). For example, resource units (i.e., a set of sub-bands/subcarriers) assigned to respective stations (STAs) may be indicated in a first trigger frame that is used to schedule a first UL MU transmission. Thereafter, a second trigger frame may indicate that the same resource unit to STA assignment/allocation, which was indicated in the first trigger frame, may be used for a second UL MU transmission. This indication may be a reference to the assignment/allocation in the first trigger frame without an explicit recital of all assignment/allocation information presented in the first trigger frame.

In some aspects, a traffic specification (TSPEC) frame extension may be utilized to support/facilitate orthogonal frequency division multiple access (OFDMA) transmissions and/or MU multi-input multi-output (MIMO) transmissions. One or more implementations of the subject technology may perform UL OFDMA and/or UL MU-MIMO retransmission and/or UL OFDMA truncation. The subject technology may be utilized in Institute of Electrical and Electronics Engineers (IEEE) systems, such as high throughput (HT), very high throughput (VHT), and high efficiency (HE) WLANs.

In an aspect, the term non-HE WLAN may refer to HT WLAN, VHT WLAN, among other WLANs that are not HE WLANs.

In one or more implementations, the AP may transmit a trigger frame to facilitate UL transmission (e.g., UL MU transmission). The trigger frame may be utilized to solicit response frames from one or more stations. For simultaneous response frames, the one or more stations may transmit their response frames using UL MU transmission technology, such as UL MU OFDMA and/or UL MU-MIMO.

A trigger frame may be a frame sent by an AP that seeks data, control, or management frame response(s) from stations that participate in a subsequent UL MU frame. The trigger frame may be utilized to initiate the simultaneous MU transmission in OFDMA. In an aspect, a trigger frame may include, for example, some or all of the following features: (a) a list of stations (STAs) that an access point (AP) seeks a response from; (b) resource allocation information (e.g., resource allocation assignment) for each STA (e.g., a subband assigned to each STA); and/or (c) attributes of the expected UL MU frame, such as the duration, bandwidth, etc., among other features. In other words, the trigger frame may be used to schedule a UL MU transmission and allocate resource for UL MU transmission and to solicit an UL MU transmission from the participating stations in response to the trigger frame. In an aspect, the trigger frame may be referred to as an uplink trigger frame, since the trigger frame may be utilized for facilitating (e.g., triggering) a UL transmission. The term "resource" may refer to, for example, a bandwidth (e.g., a subband(s), frequencies, frequency band(s)), time/duration that the STAs expect to occupy a transmission medium, and/or possibly a number of spatial streams that the STAs may use.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a media access control (MAC) layer and a physical (PHY) layer according to an IEEE 802.11 standard. In the example, at least one wireless communication device (e.g., device 111) is an access point (AP). An AP may be referred to as an AP STA, an AP device, or a central station. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. A non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, OFDMA-based 802.11 technologies are utilized, and for the sake of brevity, a STA refers to a non-AP high efficiency (HE) STA, and an AP refers to an HE AP. In one or more aspects, a STA may act as an AP.

Figure 2:
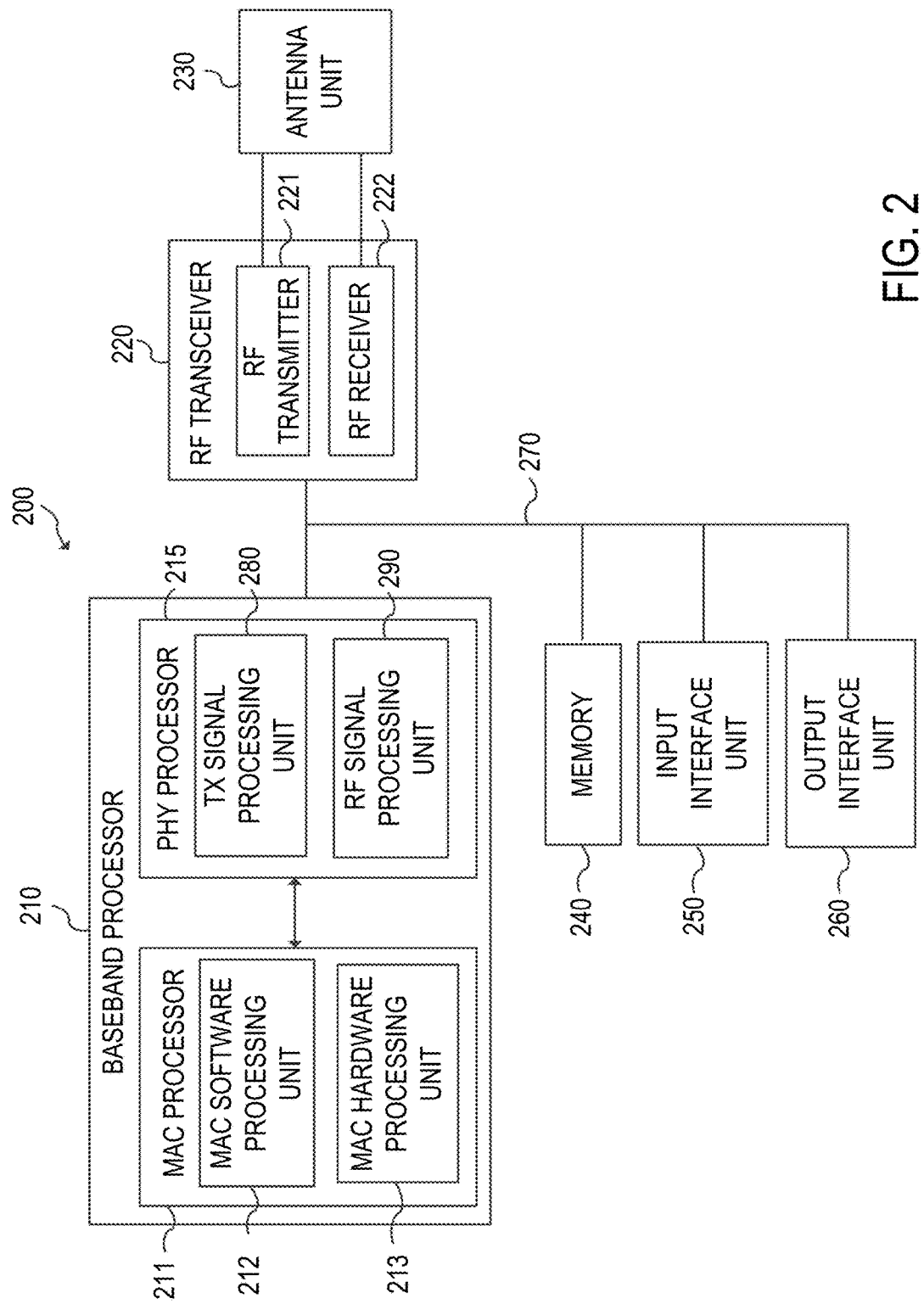
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

Figure 3A:
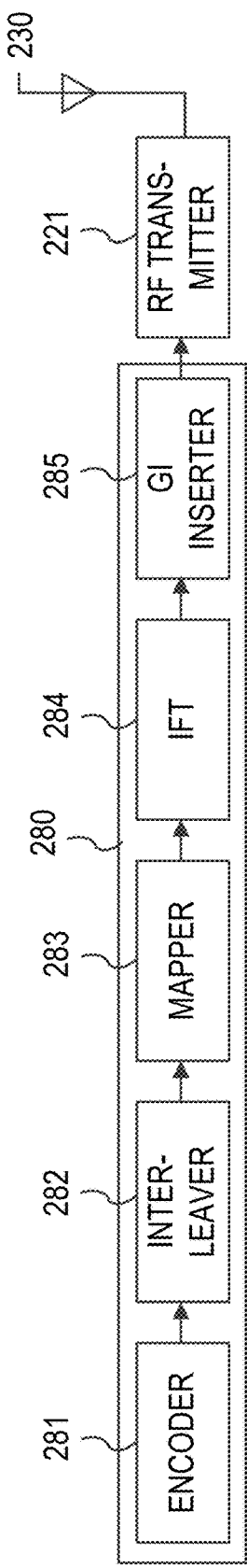
FIG. 3A illustrates a schematic block diagram of an example of a transmitting signal processor in a wireless communication device.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams ($N_{SS}$). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

Figure 3B:
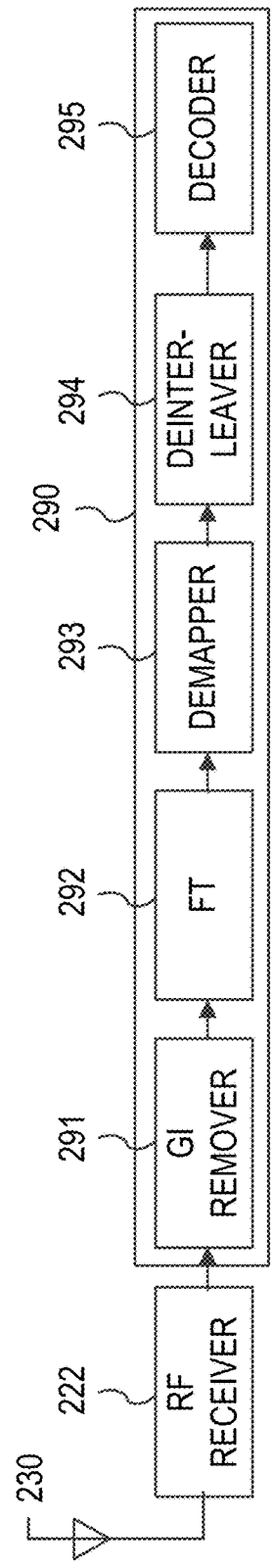
FIG. 3B illustrates a schematic block diagram of an example of a receiving signal processor in a wireless communication device.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may further include a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC decoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

Figure 4:
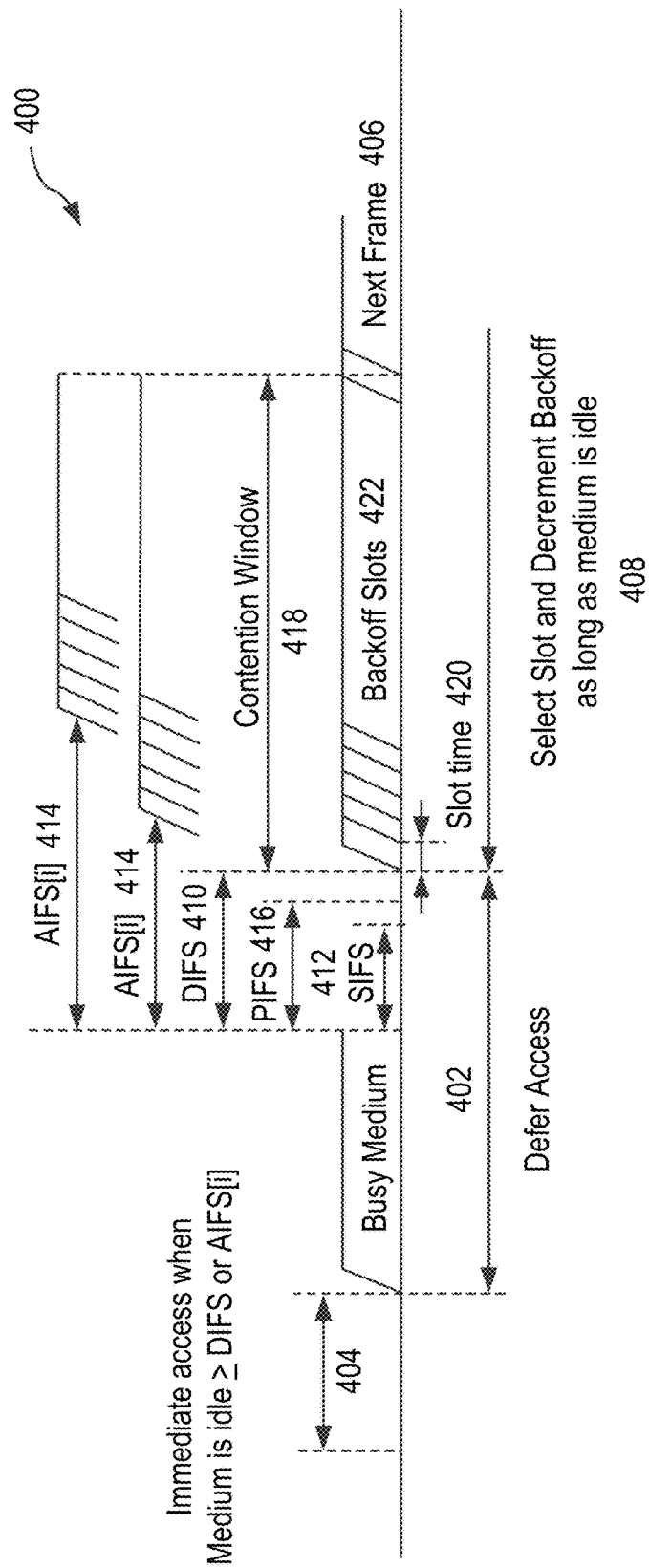
FIG. 4 illustrates an example of a timing diagram of interframe space (IFS) relationships.

FIG. 4 illustrates an example of a timing diagram of interframe space (IFS) relationships. In this example, a data frame, a control frame, or a management frame can be exchanged between the wireless communication devices 111-115 and/or other WLAN devices.

Referring to the timing diagram 400, during the time interval 402, access is deferred while the medium (e.g., a wireless communication channel) is busy until a type of IFS duration has elapsed. At time interval 404, immediate access is granted when the medium is idle for a duration that is equal to or greater than a distributed coordination function IFS (DIFS) 410 duration or arbitration IFS (AIFS) 414 duration. In turn, a next frame 406 may be transmitted after a type of IFS duration and a contention window 418 have passed. During the time 408, if a DIFS has elapsed since the medium has been idle, a designated slot time 420 is selected and one or more backoff slots 422 are decremented as long as the medium is idle.

The data frame is used for transmission of data forwarded to a higher layer. In one or more implementations, a WLAN device transmits the data frame after performing backoff if DIFS 410 has elapsed from a time when the medium has been idle.

The management frame is used for exchanging management information that is not forwarded to the higher layer. Subtype frames of the management frame include a beacon frame, an association request/response frame, a probe request/response frame, and an authentication request/response frame.

The control frame is used for controlling access to the medium. Subtype frames of the control frame include a request to send (RTS) frame, a clear to send (CTS) frame, and an ACK frame. In the case that the control frame is not a response frame of the other frame (e.g., a previous frame), the WLAN device transmits the control frame after performing backoff if the DIFS 410 has elapsed. In the case that the control frame is the response frame of the other frame, the WLAN device transmits the control frame without performing backoff if a short IFS (SIFS) 412 has elapsed. For example, the SIFS may be 16 microseconds. The type and subtype of frame may be identified by a type field and a subtype field in a frame control field of the frame.

On the other hand, a Quality of Service (QoS) STA may transmit the frame after performing backoff if AIFS 414 for access category (AC), e.g., AIFS[AC], has elapsed. In this case, the data frame, the management frame, or the control frame that is not the response frame may use the AIFS[AC].

In one or more implementations, a point coordination function (PCF) enabled AP STA transmits the frame after performing backoff if a PCF IFS (PIFS) 416 has elapsed. In this example, the PIFS 416 duration is less than the DIFS 410 but greater than the SIFS 412. In some aspects, the PIFS 416 is determined by incrementing the SIFS 412 duration by a designated slot time 420.

Figure 5:
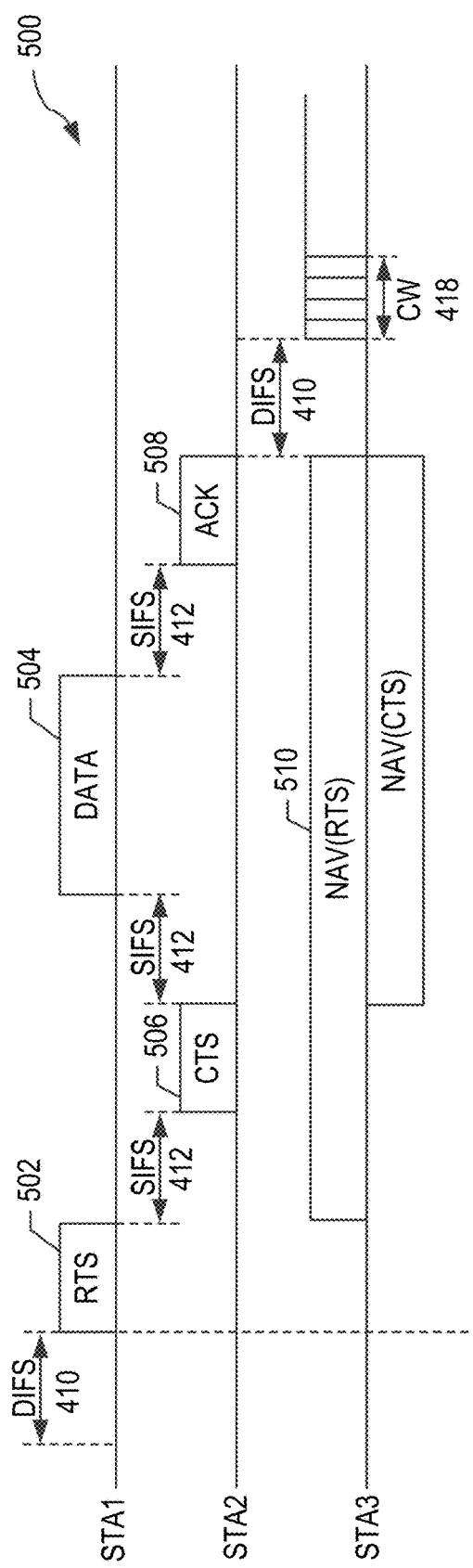
FIG. 5 illustrates an example of a timing diagram of a carrier sense multiple access/collision avoidance (CSMA/CA) based frame transmission procedure for avoiding collision between frames in a channel.

FIG. 5 illustrates an example of a timing diagram 500 of a carrier sense multiple access/collision avoidance (CSMA/

CA) based frame transmission procedure for avoiding collision between frames in a channel. In FIG. 5, any one of the wireless communication devices 111-115 in FIG. 1 can be designated as one of STA1, STA2 or STA3. In this example, the wireless communication device 111 is designated as STA1, the wireless communication device 112 is designated as STA2, and the wireless communication device 113 is designated as STA3. While the timing of the wireless communication devices 114 and 115 is not shown in FIG. 5, the timing of the devices 114 and 115 may be the same as that of STA2.

In this example, STA1 is a transmit WLAN device for transmitting data, STA2 is a receive WLAN device for receiving the data, and STA3 is a WLAN device that may be located at an area where a frame transmitted from the STA1 and/or a frame transmitted from the STA2 can be received by the STA3.

The STA1 may determine whether the channel (or medium) is busy by carrier sensing. The STA1 may determine the channel occupation based on an energy level on the channel or correlation of signals in the channel. In one or more implementations, the STA1 determines the channel occupation by using a network allocation vector (NAV) timer.

When determining that the channel is not used by other devices during the DIFS 410 (e.g., the channel is idle), the STA1 may transmit an RTS frame 502 to the STA2 after performing backoff. Upon receiving the RTS frame 502, the STA2 may transmit a CTS frame 506 as a response of the CTS frame 506 after the SIFS 412.

When the STA3 receives the RTS frame 502, the STA3 may set a NAV timer for a transmission duration representing the propagation delay of subsequently transmitted frames by using duration information involved with the transmission of the RTS frame 502 (e.g., NAV(RTS) 510). For example, the STA3 may set the transmission duration expressed as the summation of a first instance of the SIFS 412, the CTS frame 506 duration, a second instance of the SIFS 412, a data frame 504 duration, a third instance of the SIFS 412 and an ACK frame 508 duration.

Upon receiving a new frame (not shown) before the NAV timer expires, the STA3 may update the NAV timer by using duration information included in the new frame. The STA3 does not attempt to access the channel until the NAV timer expires.

When the STA1 receives the CTS frame 506 from the STA2, the STA1 may transmit the data frame 504 to the STA2 after the SIFS 412 elapses from a time when the CTS frame 506 has been completely received. Upon successfully receiving the data frame 504, the STA2 may transmit the ACK frame 508 after the SIFS 412 elapses as an acknowledgment of receiving the data frame 504.

When the NAV timer expires, the STA3 may determine whether the channel is busy by the carrier sensing. Upon determining that the channel is not used by the other WLAN devices (e.g., STA1, STA2) during the DIFS 410 after the NAV timer has expired, the STA3 may attempt the channel access after a contention window 418 has elapsed. In this example, the contention window 418 may be based on a random backoff.

Figure 6:
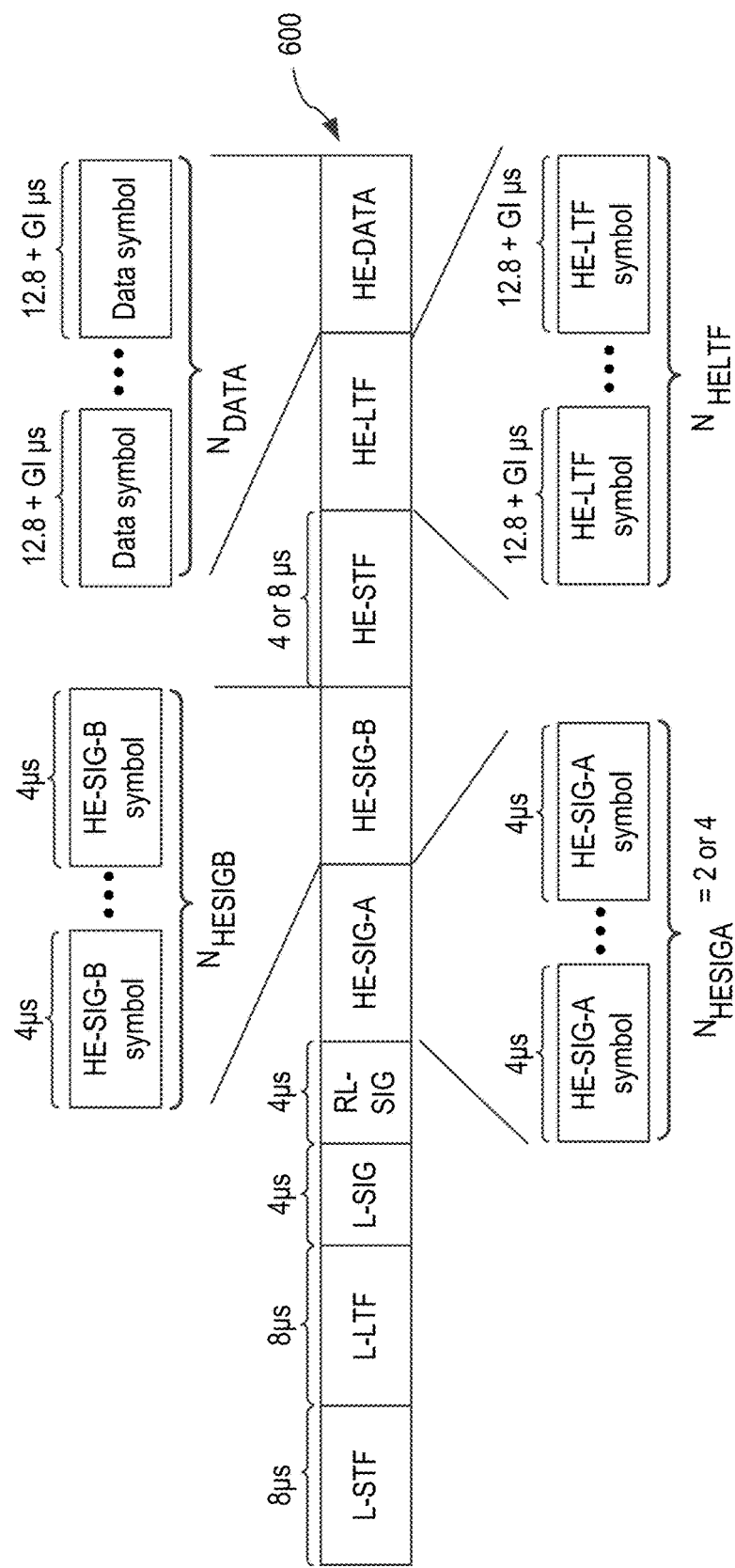
FIG. 6 illustrates an example of a high efficiency (HE) frame.

FIG. 6 illustrates an example of a high efficiency (HE) frame 600. The HE frame 600 is a physical layer convergence procedure (PLCP) protocol data unit (or PPDU) format. An HE frame may be referred to as an OFDMA frame, a PPDU, a PPDU format, an OFDMA PPDU, an MU PPDU, another similar term, or vice versa. An HE frame may be simply referred to as a frame for convenience. A transmitting station (e.g., AP, non-AP station) may generate the HE frame 600 and transmit the HE frame 600 to a receiving station. The receiving station may receive, detect, and process the HE frame 600. The HE frame 600 may include an L-STF field, an L-LTF field, an L-SIG field, an RL-SIG field, an HE-SIG-A field, an HE-SIG-B field, an HE-STF field, an HE-LTF field, and an HE-DATA field. The HE-SIG-A field may include $N_{HESIGA}$ symbols, the HE-SIG-B field may include $N_{HESIGB}$ symbols, the HE-LTF field may include $N_{HELTF}$ symbols, and the HE-DATA field may include $N_{DATA}$ symbols. In an aspect, the HE-DATA field may also be referred to as a payload field, data, payload, PSDU, or Media Access Control (MAC) Protocol Data Unit (MPDU) (e.g., MAC frame).

In one or more implementations, an AP may transmit a frame for downlink (DL) using a frame format shown in this figure or a variation thereof (e.g., without any or some portions of an HE header). A STA may transmit a frame for uplink (UL) using a frame format shown in this figure or a variation thereof (e.g., without any or some portions of an HE header).

The table below provides examples of characteristics associated with the various components of the HE frame 600.

| Element | Definition | Duration | DFT period | GI | Subcarrier Spacing | Description |
|---|---|---|---|---|---|---|
| Legacy(L)-STF | Non-high throughput (HT) Short Training field | 8 μs | — | — | equivalent to 1,250 kHz | L-STF of a non-trigger-based PPDU has a periodicity of 0.8 μs with 10 periods. |
| L-LTF | Non-HT Long Training field | 8 μs | 3.2 μs | 1.6 μs | 312.5 kHz | |
| L-SIG | Non-HT SIGNAL field | 4 μs | 3.2 μs | 0.8 μs | 312.5 kHz | |
| RL-SIG | Repeated Non-HT SIGNAL field | 4 μs | 3.2 μs | 0.8 μs | 312.5 kHz | |

| Element | Definition | Duration | DFT period | GI | Subcarrier Spacing | Description |
|---|---|---|---|---|---|---|
| HE-SIG-A | HE SIGNAL A field | $N_{HESIGA}$* 4 μs | 3.2 μs | 0.8 μs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |
| HE-SIG-B | HE SIGNAL B field | $N_{HESIGB}$* 4 μs | 3.2 μs | 0.8 μs | 312.5 kHz | $N_{HESIGB}$ means the number of OFDM symbols of the HE-SIG-B field and is variable. DL MU packet contains HE-SIG-B. Single user (SU) packets and UL Trigger based packets do not contain HE-SIG-B. |
| HE-STF | HE Short Training field | 4 or 8 μs | — | — | non-trigger-based PPDU: (equivalent to) 1,250 kHz; trigger-based PPDU: (equivalent to) 625 kHz | HE-STF of a non-trigger-based PPDU has a periodicity of 0.8 μs with 5 periods. A non-trigger-based PPDU is not sent in response to a trigger frame. The HE-STF of a trigger-based PPDU has a periodicity of 1.6 μs with 5 periods. A trigger-based PPDU is a UL PPDU sent in response to a trigger frame. |
| HE-LTF | HE Long Training field | $N_{HELTF}$* (DFT period + GI) μs | 2xLTF: 6.4 μs 4xLTF: 12.8 μs | supports 0.8, 1.6, 3.2 μs | 2xLTF: (equivalent to) 156.25 kHz; 4xLTF: 78.125 kHz | HE PPDU may support 2xLTF mode and 4xLTF mode. In the 2xLTF mode, HE-LTF symbol excluding GI is equivalent to modulating every other tone in an OFDM symbol of 12.8 μs excluding GI, and then |

-continued

| Element | Definition | Duration | DFT period | GI | Subcarrier Spacing | Description |
|---|---|---|---|---|---|---|
| | | | | | | removing the second half of the OFDM symbol in time domain. $N_{HELTF}$ means the number of HE-LTF symbols and is equal to 1, 2, 4, 6, 8. |
| HE-DATA | HE DATA field | $N_{DATA}$ * (DFT period + GI) μs | 12.8 μs | supports 0.8, 1.6, 3.2 μs | 78.125 kHz | $N_{DATA}$ means the number of HE data symbols. |

In one or more implementations, resource(s) may be requested and allocated to support a UL transmission. In some aspects, the UL transmission may be a UL MU transmission, which may utilize technologies such as UL MU OFDMA and/or UL MU-MIMO. In an aspect, a station (e.g., non-AP station) may transmit a frame that includes a traffic specification (TSPEC) element for requesting an AP to schedule/trigger a UL transmission. In an aspect, an AP may transmit a trigger frame for triggering a UL transmission by one or more stations. In response to the trigger frame, the station(s) may send data in a quality of service (QoS) data frame to the AP.

In one or more aspects, a station (e.g., non-AP station) can request that the AP allocate resources to the station for a UL transmission. In an aspect, the station may utilize a frame that includes a TSPEC element for the UL transmission request. The station may transmit the frame to the AP to request/cause the AP to allocate resources to the station for a UL transmission (e.g., UL MU transmission) and trigger the UL transmission (e.g., by sending a trigger frame). In an aspect, a frame that includes a TSPEC element may be referred to as a TSPEC frame. In an aspect, the frame may be a management frame. In an aspect, the TSPEC element may be included in a MAC frame (e.g., HE-DATA of the HE frame 600, payload of a non-HE frame, etc.).

FIG. 7 illustrates an example of a TSPEC element. The TSPEC element may include an Element Identifier (ID) field, Length (55) field, Traffic Stream Information (TS Info) field, Nominal MAC Service Data Unit (MSDU) Size field, Maximum MSDU Size field, Minimum Service Interval field, Maximum Service Interval field, Inactivity Interval field, Suspension Interval field, Service Start Time field, Minimum Data Rate field, Mean Data Rate field, Peak Data Rate field, Burst Size field, Delay Bound field, Minimum PHY Rate field, Surplus Bandwidth Allowance field, and Medium Time field. The fields of the TSPEC element may specify quality of service characteristics of a data flow to and from a station (e.g., QoS station). The TSPEC element may allow a set of parameters more extensive than may be needed, or may be available, for any particular instance of parameterized QoS traffic. In some cases, a station may set a value of any parameter to unspecified (e.g., a value of 0) if the station has no information for setting that parameter.

FIG. 8A illustrates an example of the TS Info field of the TSPEC element of FIG. 7. The TS Info field may include a Traffic Type field, Traffic Stream Identifier (TSID) field, Direction field, Access Policy field, Aggregation field, Automatic Power Save Delivery (APSD) field, User Priority field, TSInfo Acknowledgement Policy (TSInfo Ack Policy or Ack Policy) field, and Schedule field. In an aspect, the TS Info field may include some reserved bits that are unspecified (e.g., not associated with any field).

In some aspects, to facilitate UL transmission, the TS Info field may include an indication (e.g., indication bit(s)) associated with the UL transmission (not shown in FIG. 8A). In an aspect, the indication may be utilized to indicate whether a station's request for UL transmission is for UL MU-MIMO transmission only, UL OFDMA transmission only, neither UL MU-MIMO nor UL OFDMA transmission, or both UL MU-MIMO and UL OFDMA transmission. In some cases, an indication bit(s) may be utilized for indicating whether or not a station's request for a UL transmission is for a UL MU-MIMO transmission, and/or other indication bit(s) may be utilized for indicating whether or not a station's request for a UL transmission is for a UL OFDMA transmission.

FIGS. 8B and 8C illustrate other examples of the TS Info field of the TSPEC element of FIG. 7. The description from FIG. 8A generally applies to FIGS. 8B and 8C, with examples of differences and other description provided herein for purposes of clarity and simplicity.

In some aspects, the TSPEC frame may be used to request a UL OFDMA transmission. In these aspects, an indication field may be utilized to indicate the request. The indication field may be a one bit field. In some aspects, as shown for example in FIG. 8B, the TS Info field may include an OFDMA Indication field. In an aspect, the OFDMA Indication field may be a one bit field. For instance, the OFDMA Indication field may be set to a first value (e.g., 0 value) when a station is not requesting a UL OFDMA transmission and may be set to a second value (e.g., 1 value) when the station is requesting a UL OFDMA transmission. In some aspects, the TS Info field of FIG. 8B is a modified version of the TS Info field of FIG. 8A. In this regard, a reserved bit from the TS Info field of FIG. 8A may be utilized (e.g., allocated) for the OFDMA Indication field of FIG. 8B.

In FIGS. 7, 8A, 8B, and 8C, the number of bits associated with each field of the frame is provided. For example, in FIG. 8B, the OFDMA Indication field includes 1 bit. The number of bits for each field is provided by way of non-limiting example, and a number of bits for some or all fields may be different from those shown in FIGS. 7, 8A, 8B, and 8C.

In some aspects, the TSPEC frame shall be used to request one or both of an MU-MIMO or OFDMA UL transmission. In these aspects, an indication field (e.g., one bit field) may be utilized to identify if the request is for an OFDMA uplink transmission and another indication field (e.g., one bit field) may be utilized to identify if the request is for an MU-MIMO UL transmission. In some aspects, as shown for example in FIG. 8C, the TS Info field may include an OFDMA Indication field and an MU-MIMO Indication field. The OFDMA Indication field may be set to a first value (e.g., 0 value) when a station is not requesting an UL OFDMA transmission and may be set to a second value (e.g., 1 value) when the station is requesting a UL OFDMA transmission. Similarly, the MU-MIMO Indication field may be set to a first value (e.g., 0 value) when a station is not requesting an MU-MIMO transmission and may be set to a second value (e.g., 1 value) when the station is requesting an MU-MIMO transmission. In some aspects, the TS Info field of FIG. 8C is a modified version of the TS Info field of FIG. 8A or FIG. 8B. For instance, two reserved bits from the TS Info field of FIG. 8A may be utilized for the OFDMA Indication field and MU-MIMO Indication of FIG. 8C.

In one or more aspects, the AP may transmit a trigger frame to one or more stations (e.g., non-AP stations) to schedule a UL transmission. In an aspect, if the AP does not have information about traffic/buffer size of the station(s), the AP may allocate a minimum amount of time to each station. In an aspect, the minimum amount of time may be allocated as an indication for the station(s) to send a traffic/buffer status to the AP. A value of the minimum amount of time may be included in a Duration/Length field of the trigger frame. In an aspect, the Duration/Length field may be referred to as a Transmission Duration field, Transmission Length field, Duration field, or a variant thereof. In an aspect, the value may be based on a value of the Minimum Data Rate field specified in a TSPEC frame, Beacon frame, Association frame, Reassociation frame, or trigger frame. In this case, the AP may avoid wasting available bandwidth by not overestimating the UL transmission duration.

In some aspects, when a station receives the trigger frame, the station may transmit a TSPEC frame, a Null QoS frame, or an aggregated MPDU (A-MPDU) of a Null QoS Frame based on a capability element exchange in the beacon and/or association/re-association frame. In an aspect, the Null QoS frame may be referred to as a QoS Null frame. Furthermore, the AP shall indicate if the scheduled UL transmission is for transmission of data or if it is allocated for transmission of traffic/buffer information (e.g., traffic/buffer size). In an aspect, the traffic/buffer information may be sent in a TSPEC frame, a Null QoS frame with a traffic/buffer size of a specific access category (AC), or an A-MPDU of a Null QoS frame to indicate a traffic/buffer size of all ACs.

In some aspects, when a station receives the trigger frame, the station may decide whether the allocated resource (e.g., allocated duration) indicated by the Duration field is sufficient for its queued data. If the allocated duration is sufficient, the station can transmit all the queued data within the allocated duration.

In an aspect, if the allocated duration is insufficient (e.g., not long enough) for the station's queued data, the station may transmit only a part of the queued data that fits within the allocated duration and may transmit a resource request to the AP within the allocated duration. The station may communicate the resource request by setting either a Queue Size field or a transmission opportunity (TXOP) Duration Request field of a QoS Control field carried in a QoS data frame.

In an aspect, if the allocated duration is not sufficient for its queued data, the station may transmit information about a state of the station's transmit queues to the AP. The information may be contained, for instance, in a QoS Null frame or an A-MPDU of a QoS Null frame. In an aspect, the AP may transmit a trigger frame in response to receiving the station's information, and may allocate resources to the station based on the station's information. In an aspect, the trigger frames may allocate the same resources (e.g., frequency resource, spatial resource) for use in multiple UL MU transmissions. In an aspect, the durations allocated by the trigger frames for these multiple UL MU transmissions are not the same.

In one or more aspects, the AP may schedule a UL transmission and indicate resources to be utilized by each station of a group of station(s) (e.g., non-AP stations) for the UL transmission. For instance, the AP may allocate frequency resource(s) (e.g., frequency range(s), frequency sub-band(s), subcarriers) in which each station is to transmit. In an aspect, the AP may transmit a trigger frame to the group of station(s) to schedule/trigger the UL transmission and indicate the resources to the group of station(s). A station in the group of station(s) can transmit data, management, and/or control information (e.g., in a PPDU) or a MPDU/A-MPDU containing data, management, and/or control in UL transmission in accordance with the assigned/allocated resources.

In some aspects, if the AP receives at least one MPDU (e.g., HE-DATA) from each station, the AP can continue to utilize the same resource allocation for each station in the group of station(s) in subsequent UL transmissions. In these aspects, if the AP continues to utilize the previous resource allocation in a subsequent UL transmission, the AP may avoid repeating the same resource allocation in a subsequent trigger frame to be transmitted for facilitating the subsequent uplink transmission. The repetition may be avoided by utilizing a trigger frame (e.g., a shorter trigger frame) that includes an indication to use the resource allocation in a preceding trigger frame. In an aspect, the trigger frame that includes the indication does not include the explicit resource allocation indicated in the preceding trigger frame.

Figure 9:
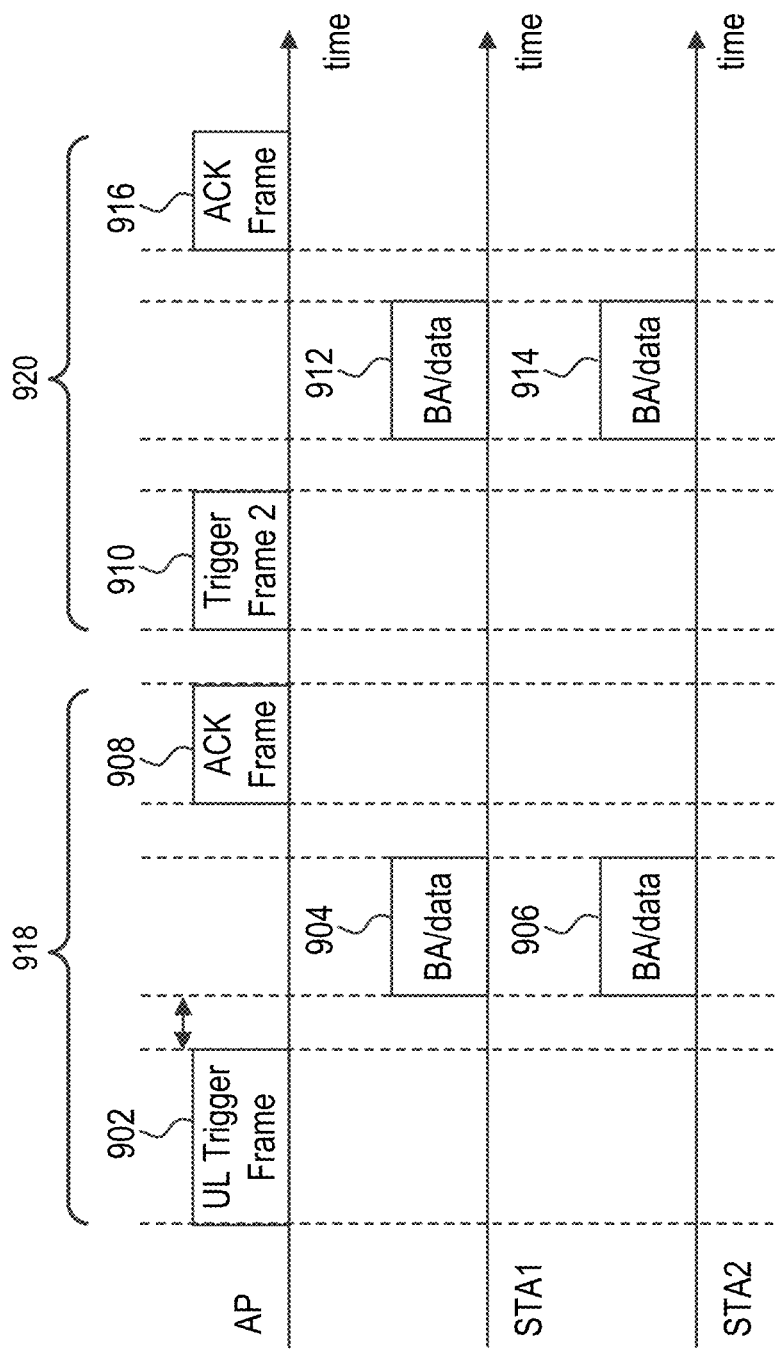
FIGS. 9 and 10 illustrate schematic diagrams of an example of exchanges of frames among wireless communication devices for multi-user transmission.

FIG. 9 illustrates a schematic diagram of an example of exchanges of frames among wireless communication devices for UL MU transmission. The wireless communication devices may include an AP, STA1, and STA2.

The AP may transmit a trigger frame 902 to STA1 and STA2. The trigger frame 902 may include resource allocation information (e.g., resource allocation assignment) for STA1 and STA2. For instance, the resource allocation information may indicate which frequency/spatial resource(s) are allocated to STA1 and STA2 for transmission of uplink frames. In response to the trigger frame 902, STA1 and STA2 may transmit an uplink frame 904 and 906, respectively, to the AP. In this regard, STA1 may transmit the uplink frame 904 based on the resource(s) allocated to STA1, as indicated in the trigger frame 902. Similarly, STA2 may transmit the uplink frame 906 based on the resource(s) allocated to STA2, as indicated in the trigger frame 902. In an aspect, STA1 and STA2 may transmit the uplink frame 904 and 906, respectively, at a predetermined time (e.g., SIFS) after transmission of the trigger frame 902. In an aspect, each of the uplink frames 904 and 906 may be a block acknowledgment (BA) frame or a data frame. The frame 904 and 906 transmitted by STA1 and STA2, respectively, may be combined over the air and decoded/perceived by the AP as a single frame/PPDU. Upon receiving the uplink frames 904 and 906, the AP may transmit an acknowledgement (ACK) frame 908 to STA1 and STA2. In FIG. 9, the trigger frame 902 may be utilized to allow transmission of a UL MU transmission sequence that includes the trigger frame 902, the uplink frames 904 and 906, and the acknowledgement frame 908.

To allow another UL MU transmission sequence, the AP may transmit a trigger frame 910 to STA1 and STA2. In an aspect, the trigger frame 910 may include an indication to STA1 and STA2 to utilize the resource allocation included in the trigger frame 902 for a UL MU transmission. In an aspect, the trigger frame 910 does not repeat the resource allocation included in the trigger frame 902. In response to the trigger frame 910, STA1 and STA2 may transmit an uplink frame 912 and 914, respectively, to the AP. Each of the uplink frames 912 and 914 may be a block acknowledgment (BA) frame or a data frame. The uplink frames 912 and 914 may be transmitted based on resource(s) allocated to STA1 and STA2, respectively, in the trigger frame 902. Upon receiving the uplink frames 912 and 914, the AP may transmit an acknowledgement frame 916 to STA1 and STA2. In an aspect, the trigger frames 902 and 910 may contain a receiver address (RA), group address (GA), and/or transmitter address (TA). In an aspect, the RA may contain a group address, such as a broadcast address or a multi-cast address.

In an aspect, the UL MU transmission sequence that includes the trigger frame 902, the uplink frames 904 and 906, and the acknowledgement frame 908 may be referred to as a first UL MU transmission session 918, and the trigger frame 910, the uplink frames 912 and 914, and the acknowledgement frame 916 may be referred to as a second UL MU transmission session 920. After the acknowledgement frame 916, the AP may transmit a subsequent trigger frame (not shown) to initiate another UL MU transmission session. The subsequent trigger frame may include an indication to utilize the resource allocation included in the trigger frame 902 for a UL MU transmission, or may include resource allocation information (e.g., if the resource allocation included in the trigger frame 902 is no longer to be used). In some cases, the AP may receive and process the uplink frames 904 and 906 sent in response to the trigger frame 902, and receive and process the uplink frames 912 and 914 sent in response to the trigger frame 910. The uplink frames 904 and 912 may be associated with a same set of resources (e.g., sub-bands), as indicated in the trigger frame 902, and the uplink frames 906 and 914 may be associated with a same set of resources, as indicated in the trigger frame 902. In some aspects, the trigger frames 902, 910, and any subsequent trigger frame in consecutive sessions that utilize the resource allocation included in the trigger frame 902 may be referred to as a cascaded sequence of trigger frames or a cascading sequence of trigger frames.

In one or more aspects, utilization of an indication in the trigger frame 910 to reuse the resource allocation included in the preceding trigger frame 902 may facilitate a reduction in overhead associated with triggering a UL MU transmission, since the trigger frame 910 may include the indication rather than explicitly include the resource allocation itself. In some cases, the trigger frame 910 may be a trigger frame without resource allocation elements. In these cases, the indication contained in the trigger frame 910 may be utilized to identify whether the trigger frame 910 contains resource allocation element fields. The indication may be contained in an identifier field of the trigger frame 910. For instance, the identifier field may be a one bit field that is set to a first state (e.g., set to 0) to indicate a trigger frame (e.g., 910) does not contain resource allocation element fields and set to a second state (e.g., set to 1) to indicate a trigger frame (e.g., 902) includes resource allocation element fields, or vice versa. In some cases, the resource allocation element fields may be OFDMA Resource Allocation Element fields, examples of which are described below with respect to FIGS. 11 and 12.

In an aspect, the trigger frame 902 may be referred to as a first type of trigger frame, in which the trigger frame 902 includes resource allocation for the station(s) participating in UL MU transmission. In an aspect, the trigger frame 910 may be referred to as a shorter trigger frame or a second type of trigger frame, in which resource allocation included in a previous trigger frame is used. The trigger frame 910 can be utilized primarily for synchronizing a UL MU transmission by STA1 and STA2. In some aspects, the trigger frames 902 and 910 may include a reference identifier (ID) (e.g., assigned by the AP).

In an aspect, if a station receives a trigger frame with the indication set (e.g., set to 1) and/or without resource allocation element fields, and if the reference ID of the trigger frame (e.g., 910) matches with the reference ID of a previous trigger frame (e.g., 902), the station shall use the previously assigned resource information included in the previous trigger frame to transmit an uplink frame (e.g., the last received trigger frame or the trigger frame indicated by the reference ID).

In one or more aspects, an indication in the trigger frame 902 may be utilized to indicate whether a subsequent trigger frame (e.g., 910) will be transmitted during a time interval (e.g., a future time interval). In an aspect, such an indication may be referred to as a trigger indication, cascade indication, or cascaded indication. In this regard, the AP may generate the trigger frame 910 in response to setting (e.g., having set) the trigger indication in the trigger frame 902 to indicate that the second trigger frame will be transmitted during the time interval, and the AP may transmit the second trigger frame during the time interval. In this regard, the trigger indication associates the trigger frame 902 to the trigger frame 910. In some cases, the trigger indication may be used in conjunction with an indication (e.g., contained in the trigger frame 910) to reuse resource allocation of a preceding trigger frame (e.g., 902).

Upon receipt of the trigger frame 902 by a station (e.g., STA1), the station may determine whether the trigger frame 902 includes a trigger indication and, if so, determine a state of the trigger indication. If the station determines that the trigger indication indicates that a second trigger frame will be transmitted by the AP during a time interval, the station may monitor (e.g., stay awake to monitor) the wireless network for the second trigger frame. In this regard, the station may determine a time at which the station is expected to receive the second trigger frame (e.g., based on the time interval indicated in the trigger frame 902) and stay awake or wake up around (e.g., slightly before) the determined time in order to monitor/detect for the second trigger frame. The station may process the second trigger frame (e.g., 910) once received from the AP and transmit an uplink frame (e.g., 912) based on the second trigger frame.

Figure 10:
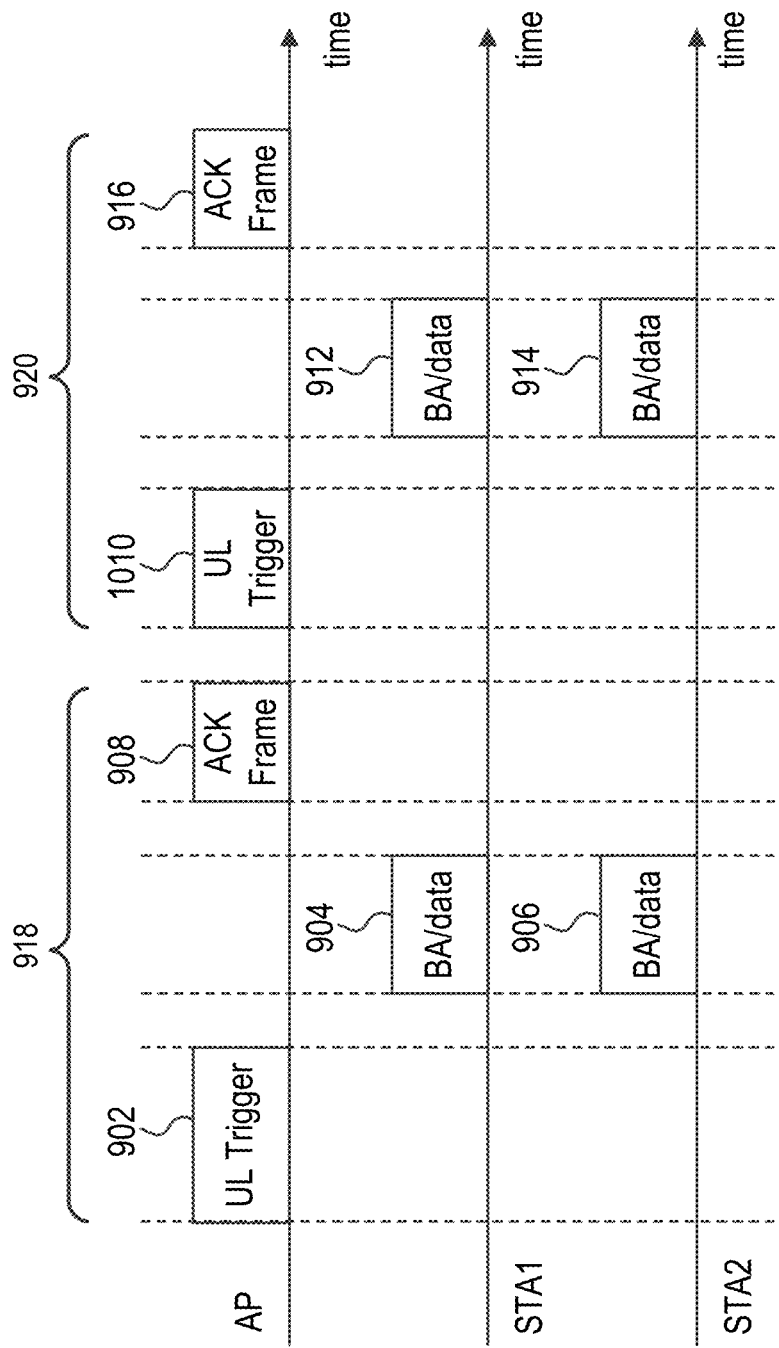

FIG. 10 illustrates a schematic diagram of an example of exchanges of frames among wireless communication devices for a set of UL MU transmissions. The description from FIG. 9 generally applies to FIG. 10, with examples of differences between FIG. 9 and FIG. 10 and other description provided herein for purposes of clarity and simplicity. In FIG. 10, the AP may transmit a trigger frame 1010 that includes resource allocation for STA1 and STA2. In an aspect, the resource allocation may be different from the resource allocation contained in the trigger frame 902. In this aspect, the trigger frame 1010 may set the indication in the trigger frame 1010 to indicate to STA1 and STA2 not to use the resource allocation contained in the trigger frame 902.

The horizontal dimension in FIGS. 9 and 10 represent the time dimension. In some aspects, a time interval between any two frames in the foregoing description may be an SIFS, PIFS, or any other time interval (e.g., any IFS interval).

In some aspects, the AP may schedule an uplink transmission opportunity and indicate information for the UL transmission, such as the frequency range, modulation and coding scheme (MCS), and/or maximum number of spatial streams ($N_{SS}$). A station (e.g., non-AP station) can transmit an uplink frame (e.g., a UL PPDU) after receiving a trigger frame. If the AP receives at least one MPDU (e.g., in the uplink frame) from the station, the AP can inform the station to use the same assignment for subsequent UL transmissions. In some aspects, an acknowledgement frame (e.g., 908 or 916) may be defined (e.g., with a Previous Assignment field) to notify the station(s) if the current assigned resource(s) is to be used by the station(s) in future UL transmission(s). The Previous Assignment field may be a one bit field.

In an aspect, the acknowledgement frame 908 may include a Previous Assignment field. If the Previous Assignment field is set to a first state (e.g., set to 1), the AP may assign new resource(s) (e.g., sub-channel range(s)) to STA1 and STA2 in a subsequent trigger frame for a subsequent UL transmission.

If the Previous Assignment field is set to a second state (e.g., set to 0), STA1 and STA2 may save UL transmission information (e.g., resource allocation information) included in the trigger frame received (e.g., 902). In some aspects, if STA1 and STA2 receive a trigger frame (e.g., 910, 1010) without resource allocation element fields, and the reference ID of the trigger frame (e.g., 910, 1010) is the same as the reference ID of a previously received trigger frame (e.g., 902), STA1 and STA2 uses the saved information to transmit the uplink frames (e.g., 912, 914) after the trigger frame (e.g., 910, 1010). In some cases, the station(s) may delete any saved UL transmission information when new/updated UL transmission information (e.g., in a trigger frame) is received by the station(s). In an aspect, setting the Previous Assignment field to the first state may be referred to as setting the Previous Assignment field, and setting the Previous Assignment field to the second state may be referred to as not setting the Previous Assignment field.

In one or more implementations, a trigger frame may include an indication for facilitating UL MU transmission and/or retransmission. In some aspects, the AP may transmit an acknowledgement frame (e.g., an ACK frame, block acknowledgement (BA) frame, multi-traffic identifier (Multi-TID) block acknowledgement frame, etc.) to station(s) from which an uplink MPDU(s) has been received. A station that has not received an acknowledgement frame for some of its transmitted uplink MPDU(s) can retransmit failed frames. The station may retransmit the failed frames during a next uplink transmission assigned by the AP and/or in an orthogonal frequency division multiplexing (OFDM) manner after running clear channel assessment (CCA) and back-off procedures.

In an aspect, a decision of whether the station retransmits the failed frames in an OFDM manner or in an MU OFDMA manner (e.g., synchronized/coordinated manner triggered by the AP) can be identified per session and/or based on an association time agreement. If the decision is made on a per session basis, the AP can indicate the decision by setting a More Session field in the trigger frame. Accordingly, the More Session field may be grouped with fields that describe characteristics and information common to the entire UL transmission. In an aspect, the More Session field may be referred to as a Retransmission field, although the More Session field may facilitate UL MU transmissions in general rather than just UL MU retransmissions. In an aspect, the More Session field may be referred to as a Cascade Indication field or a Cascaded Indication field. The More Session field may be a one bit field. The station may wait (e.g., stay awake) for another uplink assignment (e.g., provided in another trigger frame) if the More Session field was set (e.g., was set to 1) in a previous trigger frame to indicate that another trigger frame will follow. In other words, the More Session field may be a bit contained in the previous trigger frame to indicate a cascaded sequence of trigger frames. Otherwise, if the More Session field was not set (e.g., was set to 0) in the previous trigger frame, the station may run CCA and back-off procedures to retransmit the failed frame(s), since the station has no indication that the AP is sending another trigger frame to allow (e.g., coordinate) uplink transmission.

Although the foregoing describes the More Session field in relation to UL MU retransmissions, the More Session field may generally be included in a trigger frame to facilitate UL MU transmissions by indicating to a receiver (e.g., a station) of the trigger frame that an additional trigger frame will follow. In an aspect, aside from a last trigger frame in the cascaded sequence of trigger frames, each trigger frame in the cascaded sequence of trigger frames may set its respective indication field to indicate that another trigger frame will be sent (e.g., in a time interval). In the last trigger frame in the cascaded sequence of trigger frames, the indication field may be set to indicate that no trigger frame will follow at this time. In this case, the station(s) do not expect a trigger frame to follow an acknowledgement frame (e.g., 916) associated with the last trigger frame (e.g., 910) of the cascaded sequence of trigger frames. For instance, the station(s) do not expect a trigger frame at a time SIFS after transmission of the acknowledgement frame (e.g., 916) associated with the last trigger frame (e.g., 910). In some aspects, when resource allocation does not change between trigger frames in adjacent UL MU transmission sessions, the trigger frame of a current transmission session may include an indication (e.g., a one bit indication field) to indicate that the resource allocation utilized in the previous transmission session be utilized for the current transmission session.

In one or more implementations, the AP may facilitate UL OFDMA recovery/truncation. In some aspects, for UL MU transmission, the AP shall not send a contention free-end (CF-End) frame if any of the scheduled stations has something to send. In other aspects, for UL MU transmission, the AP shall not send a CF-End frame if a primary sender among the scheduled stations has something to send. In this regard, the AP may assign one of the scheduled stations as the primary sender for a UL MU transmission. In an aspect, the AP shall always assign or allocate resources for the station determined (e.g., designated) to be the primary sender, whereas the AP may, but need not, assign or allocate resources to the other stations (e.g., non-primary senders). In an aspect, the primary sender may be referred to as a primary user or a primary station.

In one or more implementations, trigger frame formats are provided for facilitating UL MU transmission. In an aspect, a trigger frame can be defined as an action frame or a control frame.

FIG. 11 illustrates an example of a trigger frame 1100. The trigger frame 1100 may include an Action/Control frame header, OFDMA Element field, and one or more OFDMA Resource Allocation Element fields. The OFDMA Element field may indicate session properties, such as a number of stations and a bandwidth (e.g., channel bandwidth) associated with the UL MU transmission being triggered by the trigger frame. In other words, the OFDMA Element field may include fields that describe characteristics and information common to the entire UL transmission. Each OFDMA Resource Allocation Element field may indicate resource(s) (e.g., frequency subband(s)) assigned for each station (e.g., user). In some aspects, an OFDMA Element field may be referred to as a Common Info field, and an OFDMA Resource Allocation Element field may be referred to as a Per User Info field.

An example of the OFDMA Element field is described below with respect to FIG. 12. Examples of an OFDMA Resource Allocation Element field (e.g., any of OFDMA Resource Allocation Element 1, 2, or n field) are described below with respect to FIGS. 13A and 13B. It is noted that the ellipses between the OFDMA Resource Allocation Element 2 field and the OFDMA Resource Allocation Element n field indicate that one or more additional OFDMA Resource Allocation Element fields or no OFDMA Resource Allocation Element fields are present between the OFDMA Resource Allocation Element 2 field and OFDMA Resource Allocation Element n field.

FIG. 12 illustrates an example of the OFDMA Element field shown in FIG. 11. The OFDMA Element field may contain the following elements: Num_elements, Reference_ID, BW, Transmission Duration, More Session, and Contain_elements. In an aspect, the elements may be referred to as fields or subfields of the OFDMA Element field:

The Num_elements field may indicate how many resource blocks, represented as n, are in the trigger frame. In this regard, the value contained in the Num_elements field may indicate the number of OFDMA Resource Allocation Element fields contained in the trigger frame (e.g., 1100). In some cases, several non-continuous frequency blocks may be allocated to the same station. In an aspect, if more than one continuous frequency block is assigned to one station, an element per block may be defined. The Reference_ID field may identify a type or group of receivers. The BW field may indicate the bandwidth range (e.g., channel bandwidth range) that has been assigned to the UL transmission session. By way of non-limiting example, the allocated bandwidth can be 20 MHz, 40 MHz, 80 MHz, or 160 MHz. The Transmission Duration field may indicate a length indicative of an uplink frame duration (or length of a portion of the uplink frame duration). In an aspect, the Transmission Duration field may indicate the same duration of uplink MPDU for all users. In an aspect, the Transmission Duration field may be set to a minimum amount of time for each station (e.g., to avoid overestimating the UL transmission duration, such as when the AP does not have information about traffic/buffer size of the station(s)).

In some aspects, the More Session field may be referred to as a Cascade Indication field or Cascaded Indication field and may be a field (e.g., subfield) of the Common Info field. The More Session field may indicate that the AP will schedule another uplink transmission session (e.g., in a time interval). Such an indication in the More Session field may be referred to as a trigger indication, cascade indication, or cascaded indication. For instance, with reference to FIG. 9, when the More Session field is set (e.g., set to 1) in the trigger frame 902, a receiver(s) (e.g., STA1, STA2, among possible others) of the trigger frame 902 may expect to receive a subsequent trigger frame (e.g., 910) after receiving the acknowledgement frame 908 associated with the trigger frame 902. In an aspect, the More Session field may be a one bit field (e.g., the trigger indication is one bit). In an aspect, when the More Session field is set (e.g., set to 1), a station does not compete for transmitting/retransmitting frames (e.g., for the same AC).

FIG. 13A illustrates an example of any one of the OFDMA Resource Allocation Element fields shown in FIG. 11. The OFDMA Resource Allocation Element field may indicate a block of resources (e.g., continuous resources) allocated to an individual receiver or group of receivers. The OFDMA Resource Allocation Element field may include a Group/Individual field, a Group ID field, a Start sub-channel field, and a Number of sub-channel field. The Start sub-channel field may indicate from which sub-channels (e.g., which tone) the block of resources starts. The Number of sub-channel field may indicate the length (e.g., number of tones) of the allocated resource. The Group/Individual field may indicate if an individual station has been assigned to transmit in the assigned resource (e.g., frequency resource) or if a group of users (e.g., stations) has been assigned the resource and shall compete for the resource specified by the Start sub-channel field and Number of sub-channel field.

The field following the Group/Individual field may be defined based on the value contained in the Group/Individual field. For example, if the value of the Group/Individual field is equal to 1, the next field is a Group_ID field. Otherwise, the next field is a STA_ID field. In FIG. 13A, the field immediately following the Group/Individual field is a STA_ID field. The STA_ID field may be an identification (e.g., identifier) of a station assigned by AP to the station during an association time or reassociation time.

FIG. 13B illustrates another example of any one of the OFDMA Resource Allocation Element fields shown in FIG. 11. The description from FIG. 13A generally applies to FIG. 13B, with examples of differences between FIG. 13A and FIG. 13B and other description provided herein for purposes of clarity and simplicity. In FIG. 13B, the field immediately following the Group/Individual field is a Group_ID field. The Group_ID field may include an identification (e.g., identifier) assigned by the AP to a group of stations. In an aspect, if the Group_ID is set to a predetermined value (e.g., 0), all stations can compete to have access to the assigned resource (e.g., frequency resource). Otherwise, only the stations associated with (e.g., belong to) the Group_ID field shall compete for transmission on the assigned resource.

Although the foregoing makes reference to using resource allocation element fields for expressing/conveying resource allocation information and/or scheduling information, in some cases, other manners by which to express/convey resource allocation information and/or scheduling information (aside from resource allocation element fields) may be utilized.

It should be noted that like reference numerals may designate like elements. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

The embodiments provided herein have been described with reference to a wireless LAN system; however, it should be understood that these solutions are also applicable to other network environments, such as cellular telecommunication networks, wired networks, etc.

An embodiment of the present disclosure may be an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations may be performed by specific hardware components that contain hardwired logic (e.g., dedicated digital filter blocks and state machines). Those operations may alternatively be performed by any combination of programmed data processing components and fixed hardwired circuit components.

In some cases, an embodiment of the present disclosure may be an apparatus (e.g., an AP STA, a non-AP STA, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

Figure 14A:
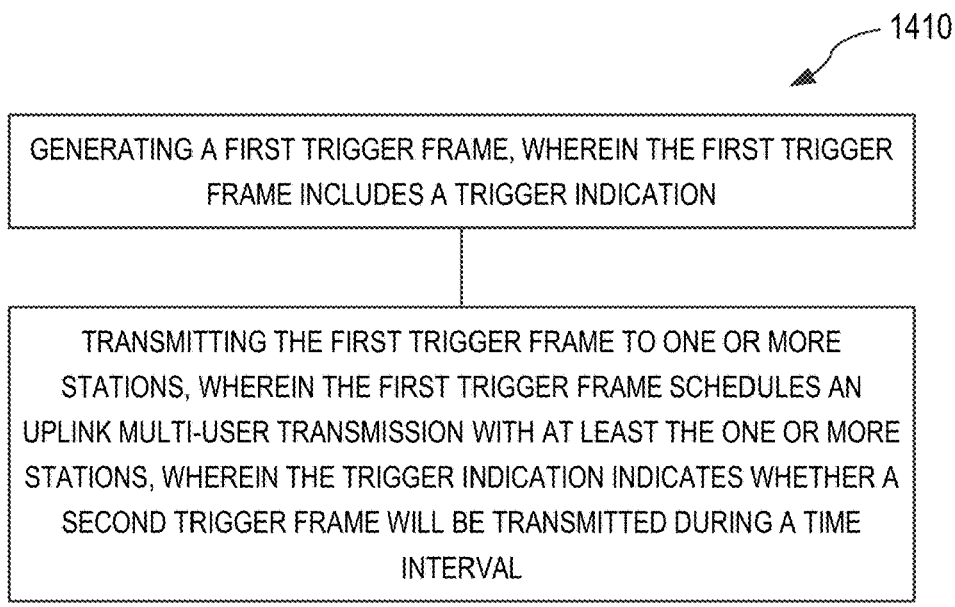
FIGS. 14A and 14B illustrate flow charts of examples of methods for facilitating wireless communication for uplink transmission.
Figure 14B:
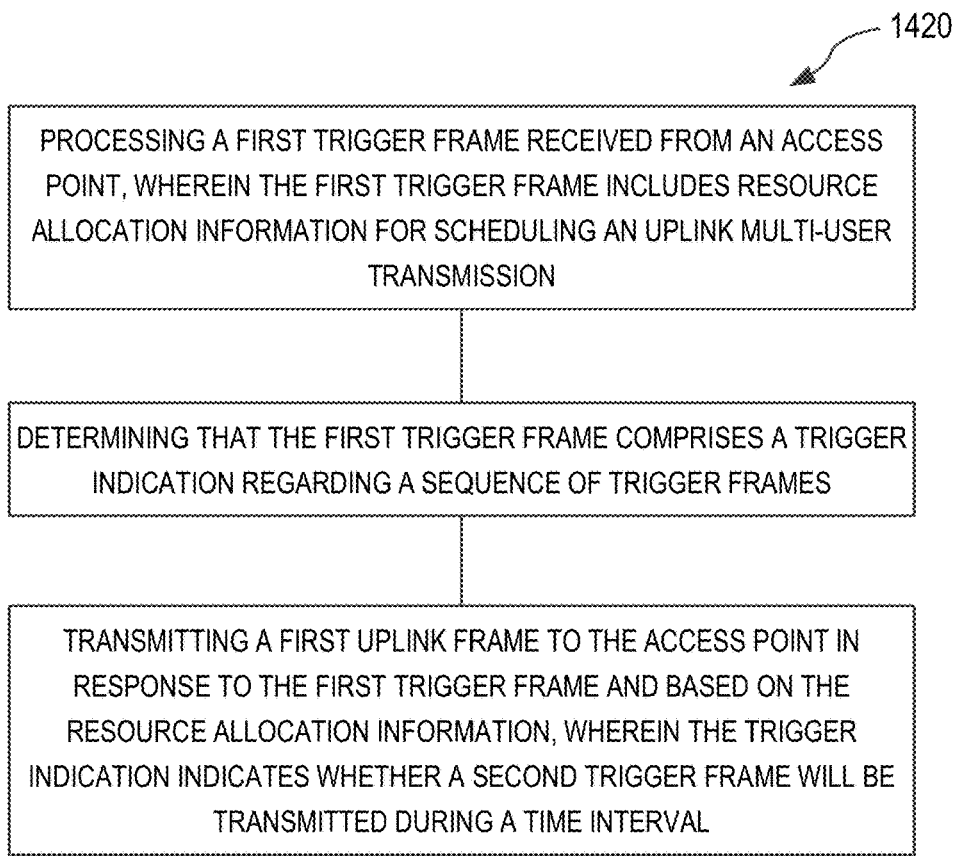

FIGS. 14A and 14B illustrate flow charts of examples of methods for facilitating wireless communication. For explanatory and illustration purposes, the example processes 1410 and 1420 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 1410 and 1420 are not limited to the wireless communication devices 111-115 of FIG. 1 or their components, and the example processes 1410 and 1420 may be performed by some of the devices shown in FIG. 1, or other devices or components. Further for explanatory and illustration purposes, the blocks of the example processes 1410 and 1420 are described herein as occurring in serial or linearly. However, multiple blocks of the example processes 1410 and 1420 may occur in parallel. In addition, the blocks of the example processes 1410 and 1420 need not be performed in the order shown and/or one or more of the blocks/actions of the example processes 1410 and 1420 need not be performed.

Various examples of aspects of the disclosure are described below as clauses for convenience. These are provided as examples, and do not limit the subject technology. As an example, some of the clauses described below are illustrated in FIGS. 14A and 14B.

Clause A. An access point for facilitating communication in a wireless network for multi-user transmission, the access point comprising: one or more memories; and one or more processors coupled to the one or more memories, the one or more processors configured to cause: generating a first trigger frame, wherein the first trigger frame includes a trigger indication; and transmitting the first trigger frame to one or more stations, wherein the first trigger frame schedules an uplink multi-user transmission with at least the one or more stations, wherein the trigger indication indicates whether a second trigger frame will be transmitted during a time interval.

Clause B. A station for facilitating communication in a wireless network for multi-user transmission, the station comprising: one or more memories; and one or more processors coupled to the one or more memories, the one or more processors configured to cause: processing a first trigger frame received from an access point, wherein the first trigger frame includes resource allocation information for scheduling an uplink multi-user transmission; determining that the first trigger frame comprises a trigger indication regarding a sequence of trigger frames; and transmitting a first uplink frame to the access point in response to the first trigger frame and based on the resource allocation information, wherein the trigger indication indicates whether a second trigger frame will be transmitted during a time interval.

Clause C. A computer-implemented method of facilitating multi-user communication in a wireless network, the method comprising: processing a first trigger frame received from an access point, wherein the first trigger frame includes resource allocation information for scheduling an uplink multi-user transmission; determining that the first trigger frame comprises a trigger indication regarding a sequence of trigger frames; and transmitting a first uplink frame to the access point in response to the first trigger frame and based on the resource allocation information, wherein the trigger indication indicates whether a second trigger frame will be transmitted during a time interval.

In one or more aspects, additional clauses are described below.

A method comprising one or more methods or operations described herein.

An apparatus or a station comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus or a station comprising one or more memories (e.g., 240, one or more internal, external or remote memories, or one or more registers) and one or more processors (e.g., 210 or one or more portions), wherein the one or more memories store instructions that, when executed by the one or more processors, cause the one or more processors to perform one or more methods or operations described herein.

An apparatus or a station comprising means (e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

A computer-readable storage medium (e.g., 240, one or more internal, external or remote memories, or one or more registers) storing instructions that, when executed by one or more processors (e.g., 210 or one or more portions), cause the one or more processors to perform one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A station for facilitating communication in a wireless network for multi-user transmission, the station comprising:
   one or more memories; and
   one or more processors coupled to the one or more memories, the one or more processors configured to cause:
   processing a first trigger frame received from an access point; and
   processing a second trigger frame received from an access point during a time interval, wherein the second trigger frame does not repeat a resource allocation included in the first trigger frame and requests one or more stations to utilize the resource allocation for an uplink multi-user transmission.

2. The station of claim 1, wherein the first trigger frame includes resource allocation information for scheduling the uplink multi-user transmission.

3. The station of claim 2, wherein the resource allocation information includes resource allocation assignment to the station for the uplink multi-user transmission.

4. The station of claim 2, wherein the one or more processors are configured to cause:
transmitting a first uplink frame to the access point in response to the first trigger frame and based on the resource allocation information.

5. The station of claim 4, wherein the one or more processors are configured to cause:
determining that the first trigger frame comprises a trigger indication regarding a
sequence of trigger frames, wherein the trigger indication indicates that the second trigger frame will be transmitted during the time interval.

6. The station of claim 5, wherein the one or more processors are configured to cause:
monitoring the wireless network for the second trigger frame in response to determining that the trigger indication indicates that the second trigger frame will be transmitted during the time interval; and
transmitting a second uplink frame based on the second trigger frame.

7. The station of claim 6, wherein the second uplink frame and the first uplink frame are transmitted using a same set of sub-bands as indicated in the resource allocation information of the first trigger frame.

8. A computer-implemented method of facilitating multi-user communication in a wireless network, the method comprising:
processing a first trigger frame received from an access point;
transmitting a first uplink frame to the access point in response to the first trigger frame; and
processing a second trigger frame received from an access point during a time interval, wherein the second trigger frame does not repeat a resource allocation included in the first trigger frame and requests one or more stations to utilize the resource allocation for an uplink multi-user transmission.

9. The computer-implemented method of claim 8, wherein the first trigger frame includes resource allocation information for scheduling the uplink multi-user transmission.

10. The computer-implemented method of claim 9, further comprising:
transmitting a first uplink frame to the access point in response to the first trigger frame and based on the resource allocation information.

11. The computer-implemented method of claim 10, further comprising:
determining that the first trigger frame comprises a trigger indication regarding a sequence of trigger frames, wherein the trigger indication indicates that the second trigger frame will be transmitted during the time interval.

12. The computer-implemented method of claim 11, further comprising:
monitoring the wireless network for the second trigger frame in response to determining that the trigger indication indicates that the second trigger frame will be transmitted during the time interval; and
transmitting a second uplink frame based on the second trigger frame.

13. The computer-implemented method of claim 12, wherein the second uplink frame and the first uplink frame are transmitted using a same set of sub-bands as indicated in the resource allocation information of the first trigger frame.

14. An access point for facilitating communication in a wireless network for multi-user transmission, the access point comprising:
one or more memories; and
one or more processors coupled to the one or more memories, the one or more processors configured to cause:
transmitting a first trigger frame to one or more stations; and
transmitting a second trigger frame to the one or more stations during a time interval, wherein the second trigger frame does not repeat a resource allocation included in the first trigger frame and requests the one or more stations to utilize the resource allocation for an uplink multi-user transmission with at least one of the one or more stations.

15. The access point of claim 14, wherein the one or more processors are configured to cause:
generating the first trigger frame, wherein the first trigger frame includes a trigger indication, wherein the trigger indication indicates that the second trigger frame will be transmitted during the time interval.

16. The access point of claim 15, wherein the one or more processors are configured to cause:
generating the second trigger frame in response to setting the trigger indication in the first trigger frame to indicate that the second trigger frame will be transmitted during the time interval.

17. The access point of claim 15, wherein the second trigger frame includes resource allocation assignment to the one or more stations and the second trigger frame schedules an uplink multi-user transmission with at least the one or more stations when the resource allocation included in the first trigger frame is no longer to be used.

18. The access point of claim 15, wherein the trigger indication indicates an association between the first trigger frame and the second trigger frame.

19. The access point of claim 14, wherein the one or more processors are configured to cause:
processing a first uplink frame from a first station of the one or more stations and a second uplink frame from the first station, and wherein the first uplink frame and the second uplink frame are associated with a same set of sub-bands as indicated in the resource allocation in the first trigger frame.

20. The access point of claim 14, wherein the one or more processors are configured to cause:
processing a first uplink frame from a first station of the one or more stations; and processing a second uplink frame from the first station of the one or more stations,
wherein the first uplink frame is received following transmission of the first trigger frame and before transmission of the second trigger frame and the second uplink frame is received following transmission of the second trigger frame,
wherein:
the first trigger frame comprises a length of the first uplink frame,
the second trigger frame comprises a length of the second uplink frame, and
the length of the first uplink frame is less than the length of the second uplink frame.

* * * * *